(12) United States Patent
Abgrall

(10) Patent No.: US 6,401,202 B1
(45) Date of Patent: Jun. 4, 2002

(54) MULTITASKING DURING BIOS BOOT-UP

(75) Inventor: Jean-Paul Abgrall, San Jose, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,110

(22) Filed: Jun. 18, 1999

(51) Int. Cl.[7] ............................................. G06F 9/445
(52) U.S. Cl. .......................................................... 713/2
(58) Field of Search .............................. 713/2; 709/107

(56) References Cited

U.S. PATENT DOCUMENTS

| | | | |
|---|---|---|---|
| 5,063,496 A | * 11/1991 | Dayan et al. ............... 713/200 |
| 5,121,345 A | 6/1992 | Lentz | |
| 5,128,995 A | 7/1992 | Arnold et al. | |
| 5,131,089 A | 7/1992 | Cole | |
| 5,142,680 A | 8/1992 | Ottman et al. | |
| 5,146,568 A | 9/1992 | Flaherty et al. | |
| 5,214,695 A | 5/1993 | Arnold et al. | |
| 5,274,816 A | 12/1993 | Oka | |
| 5,280,627 A | 1/1994 | Flaherty et al. | |
| 5,307,497 A | 4/1994 | Feigenbaum et al. | |
| 5,325,532 A | 6/1994 | Crosswy et al. | |
| 5,379,431 A | 1/1995 | Lemon et al. | |
| 5,381,549 A | 1/1995 | Tamura | |
| 5,418,918 A | 5/1995 | Vander Kamp et al. | |
| 5,444,850 A | 8/1995 | Chang | |
| 5,448,741 A | 9/1995 | Oka | |
| 5,452,454 A | 9/1995 | Basu | |
| 5,463,766 A | 10/1995 | Schieve et al. | |
| 5,469,573 A | 11/1995 | McGill, III et al. | |
| 5,504,905 A | 4/1996 | Cleary et al. | |
| 5,522,076 A | 5/1996 | Dewa et al. | |
| 5,526,523 A | 6/1996 | Straub et al. | |
| 5,542,082 A | 7/1996 | Solhjell | |
| 5,581,740 A | 12/1996 | Jones | |
| 5,586,327 A | 12/1996 | Bealkowski et al. | |
| 5,594,903 A | 1/1997 | Bunnell et al. | |
| 5,604,890 A | 2/1997 | Miller | |
| 5,652,868 A | 7/1997 | Williams | |
| 5,652,886 A | 7/1997 | Tulpule et al. | |
| 5,664,194 A | 9/1997 | Paulsen | |
| 5,680,547 A | 10/1997 | Chang | |
| 5,692,190 A | 11/1997 | Williams | |
| 5,694,583 A | 12/1997 | Williams et al. | |
| 5,694,600 A | 12/1997 | Khenson et al. | |
| 5,701,477 A | 12/1997 | Chejlava, Jr. | |
| 5,715,456 A | 2/1998 | Bennett et al. | |
| 5,717,930 A | 2/1998 | Imai et al. | |
| 5,727,213 A | 3/1998 | Vander Kamp et al. | |
| 5,732,268 A | 3/1998 | Bizzarri | |
| 5,748,957 A | 5/1998 | Klein | |
| 5,754,853 A | 5/1998 | Pearce | |
| 5,764,593 A | 6/1998 | Turpin et al. | |
| 5,781,758 A | 7/1998 | Morley | |
| 5,790,849 A | 8/1998 | Crocker et al. | |
| 5,796,984 A | 8/1998 | Pearce et al. | |
| 5,802,363 A | 9/1998 | Williams et al. | |
| 5,805,880 A | 9/1998 | Pearce et al. | |
| 5,805,882 A | 9/1998 | Cooper et al. | |
| 5,815,706 A | 9/1998 | Stewart et al. | |
| 5,819,063 A | 10/1998 | Dahl et al. | |
| 5,828,888 A | 10/1998 | Kozaki et al. | |
| 5,832,251 A | 11/1998 | Takahashi | |
| 5,842,011 A | 11/1998 | Basu | |
| 5,854,905 A | 12/1998 | Garney | |
| 5,864,698 A | 1/1999 | Krau et al. | |
| 5,887,164 A | 3/1999 | Gupta | |
| 5,901,310 A | 5/1999 | Rahman et al. | |
| 5,907,679 A | 5/1999 | Hoang et al. | |
| 5,978,912 A | * 11/1999 | Rakavy et al. ................. 713/2 |

* cited by examiner

Primary Examiner—Thomas M. Heckler

(57) ABSTRACT

The present invention is a method and apparatus to perform multitasking in a basic input and output system (BIOS). Interrupt signals are enabled at predetermined interrupt times. A first task is performed in response to the interrupt signals at the interrupt times. A second task is performed between the successive interrupt times.

40 Claims, 7 Drawing Sheets

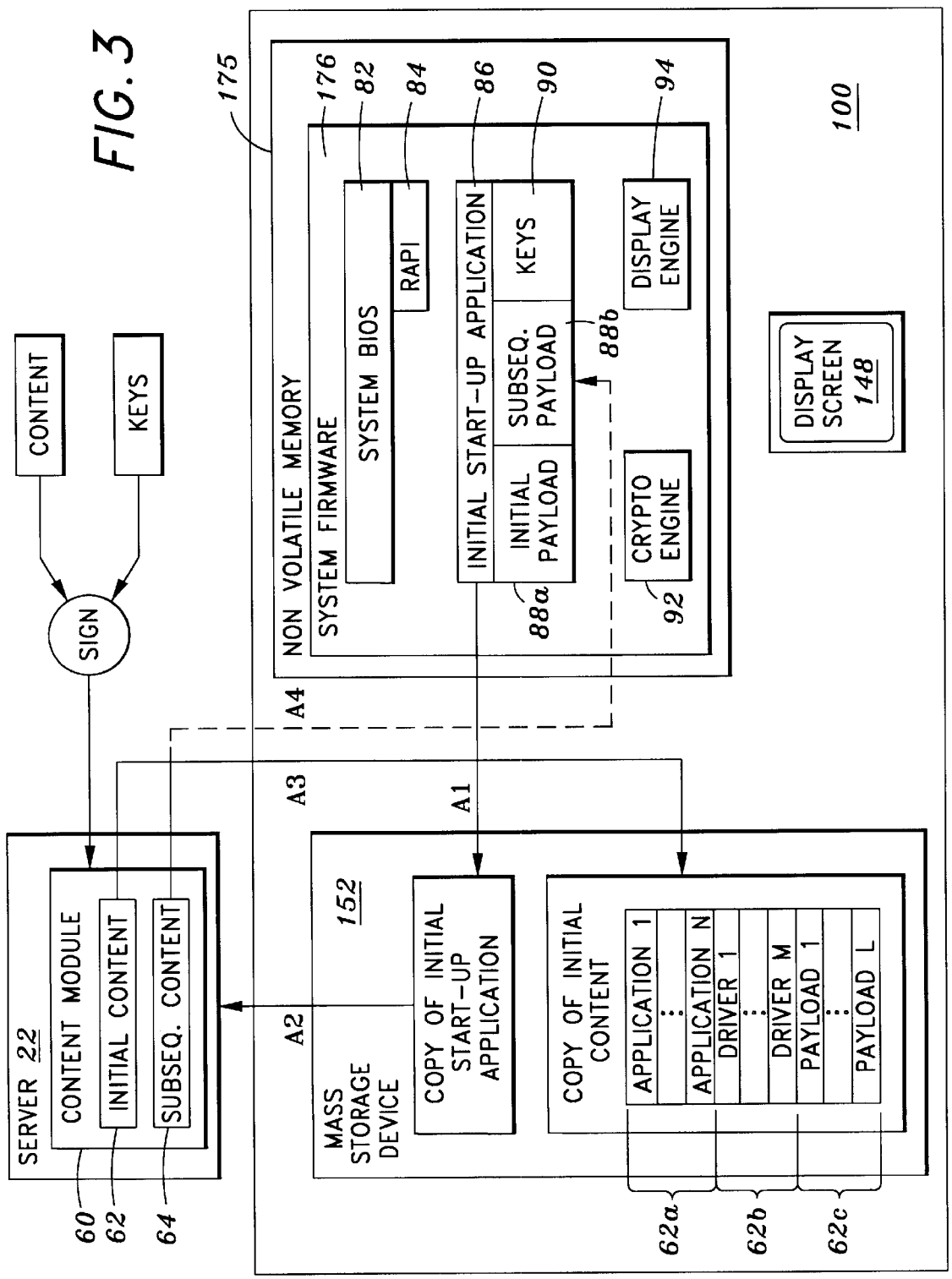

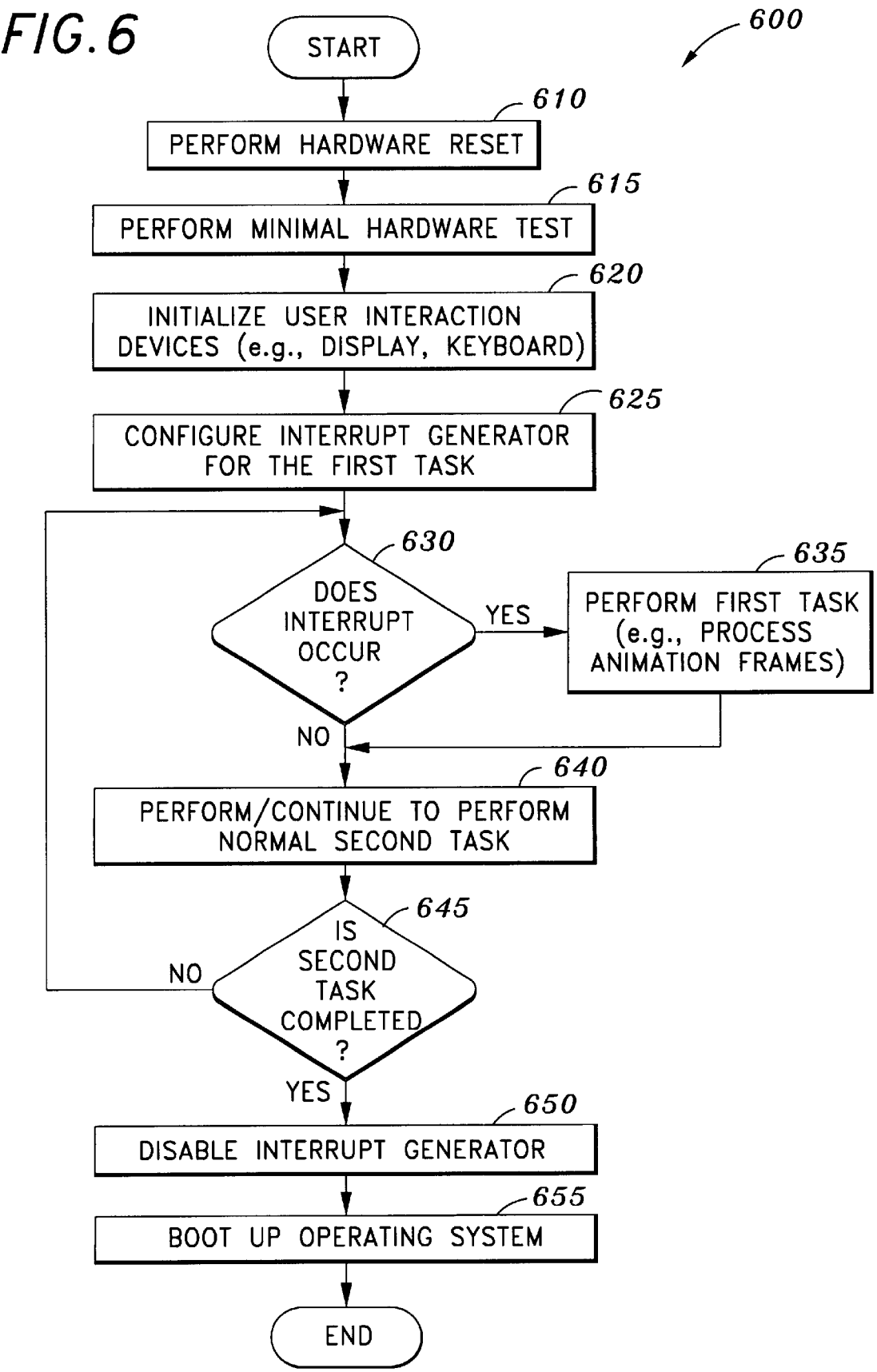

MULTITASKING DURING BIOS BOOT-UP

BACKGROUND OF THE INVENTION

1. Field of the Invention

This invention relates to firmware in a processor based system. In particular, the invention relates to multitasking in basic input and output system (BIOS).

2. Description of Related Art

To execute a program, a processor in a computer system has to access the executable code of the program from the memory. When the computer is first powered up, the processor usually executes the firmware which generally is the Basic Input and Output System (BIOS) program. The BIOS contains the executable code for a boot-up program. It is essentially a built-in software containing a set of instructions that control systems devices and test memory. Because it is typically stored in a Read-Only Memory (ROM) chip on the motherboard, it is sometimes call the ROM BIOS.

In a typical power up sequence, upon power up the processor "wakes up" and sends a message to activate the BIOS. When executed, the BIOS runs a series of tests, called the POST for Power On Self Test, to make sure the system devices are working correctly. In general, the BIOS initializes system hardware and chipset registers, initializes power management, tests RAM (Random Access Memory), enables the keyboard, tests serial and parallel ports, initializes floppy disk drives and hard disk drive controllers, and displays system summary information. During POST, the BIOS compares the system configuration data obtained from POST with the system information stored in a non-volatile memory, generally a CMOS (Complementary Metal-Oxide Semiconductor) memory chip located on the motherboard. This non-volatile memory chip, which is updated whenever new system components are added, contains the latest information about system components.

After the POST tasks are completed, the BIOS looks for the boot program responsible for loading the operating system. Usually, the BIOS looks on the floppy disk drive A followed by hard drive C. After being loaded into memory, the boot program then loads the system configuration information, typically contained in the registry in the operating system (OS) environment, and device drivers. Finally, the operating system is loaded, and, default programs in a start up directory or folder are executed.

The BIOS also helps operating systems and application programs manage the hardware by means of a set of routines called BIOS Run-Time Services. Application programs as well as the operating system can call these services to perform hardware-related functions.

The BIOS boot-up sequence typically takes some time to complete. Depending on the BIOS tasks, the type and speed of the processor, the BIOS boot-up time may vary from a few seconds to half a minute. During this time, the display typically shows system status information, summary of statistics, and results of the tests. Since most computer systems are functional and operational, the displayed information usually is not interesting. The BIOS boot-up sequence typically consists of a series of sequential tasks. These sequential tasks are mainly for internal tests and device initialization. During that time, the user is not provided useful or interesting information.

Therefore there is a need in the technology to provide a simple and efficient method to perform multitasking during BIOS boot-up.

SUMMARY

The present invention is a method and apparatus to perform multitasking in a basic input and output system (BIOS). Interrupt signals are enabled at predetermined interrupt times. A first task is performed in response to the interrupt signals at the interrupt times. A second task is performed between the successive interrupt times.

BRIEF DESCRIPTION OF THE DRAWINGS

The features and advantages of the present invention will become apparent from the following detailed description of the present invention in which:

FIG. 3 illustrates a logical diagram of one embodiment of the invention.

FIG. 6 is a flowchart illustrating a process to perform multitasking in a BIOS according to one embodiment of the invention.

DESCRIPTION

Figure 1:
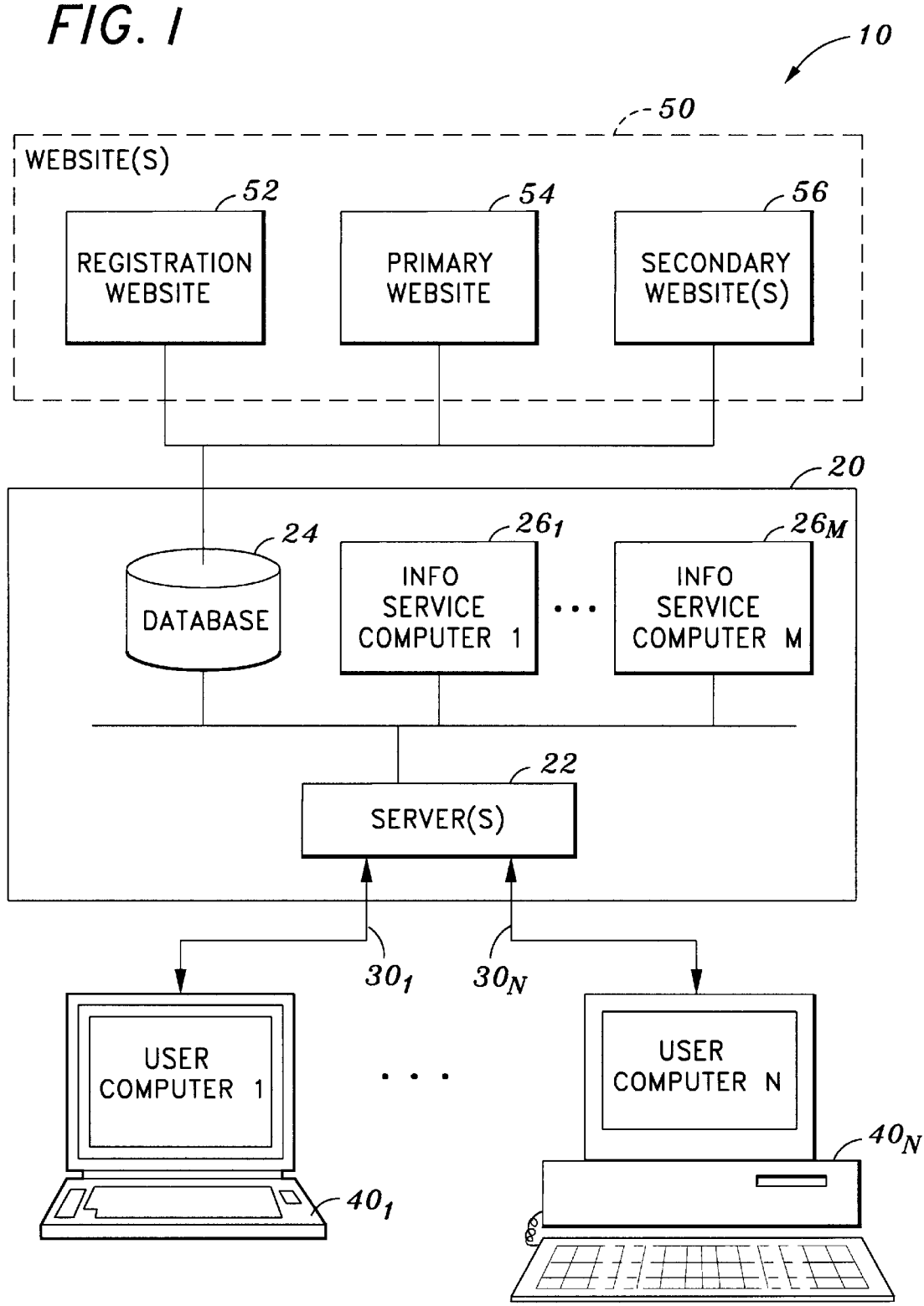
FIG. 1 is a system block diagram of one embodiment of an information distribution system in which the apparatus and method of the invention is used.

The present invention is a method and apparatus to perform multitasking in a BIOS. At the beginning of the BIOS, an interrupt sequence corresponding to a plurality of interrupt times is generated. A first task is performed at the interrupt times. A second task is performed between successive interrupt times. The technique provides efficient use of BIOS boot-up time to display useful and interesting information on the screen.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as, articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
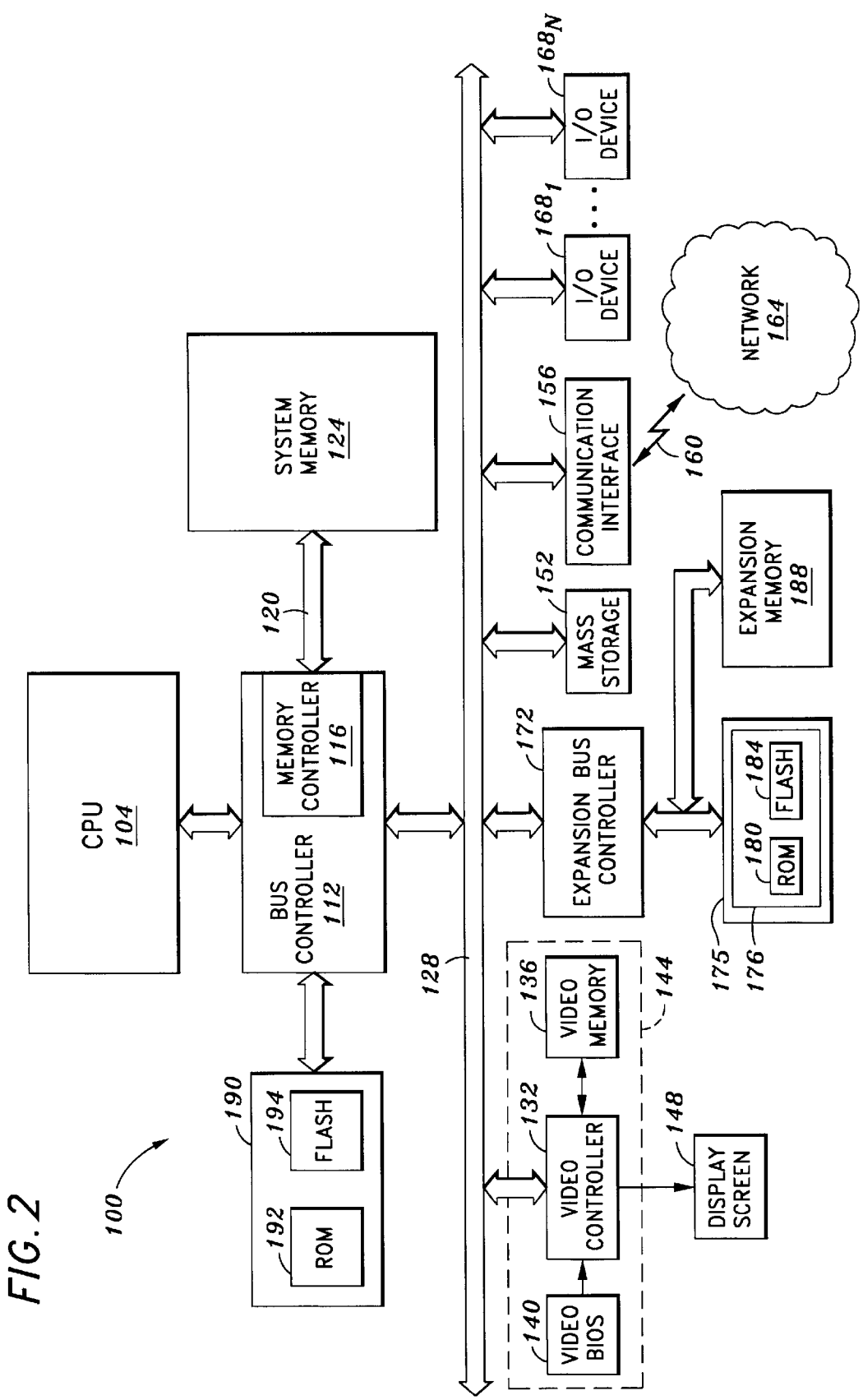
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
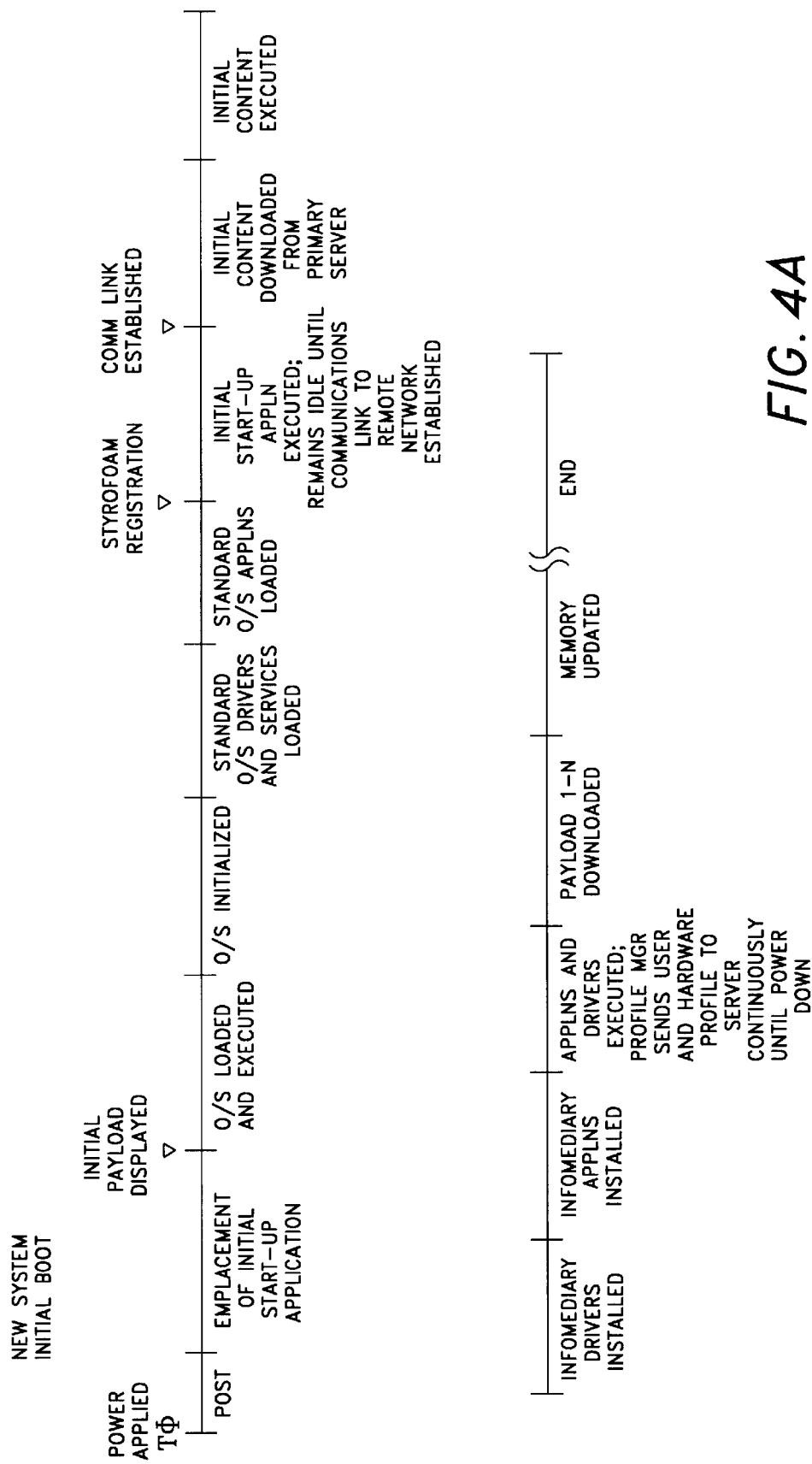
FIGS. 4A and 4B illustrates one embodiment of a process flow chart provided in accordance with the principles of the invention.
Figure 4B:
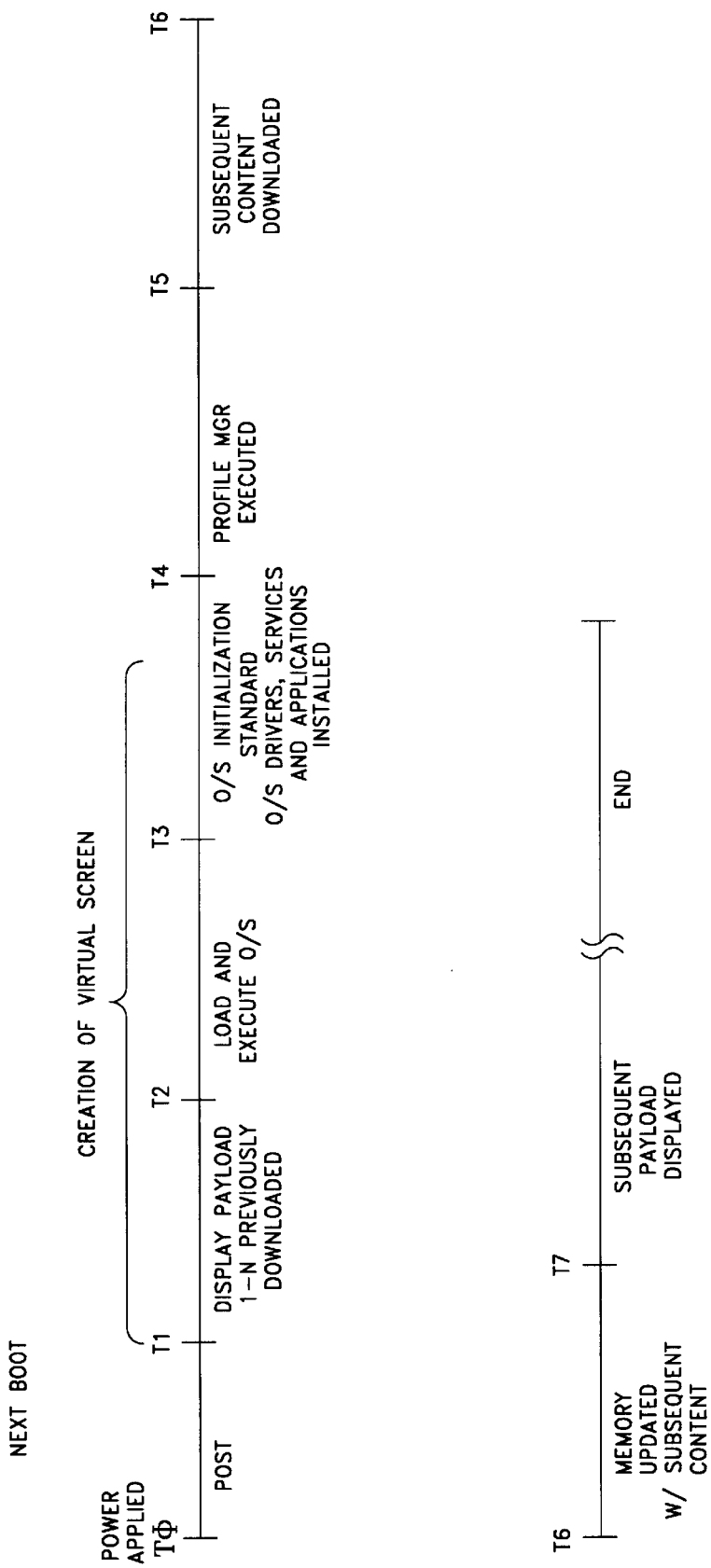

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent Continuation-in-Part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88*a* is displayed by display engine 94 on the user's display screen 148 during POST. Alternatively, the graphical content of the initial payload 88*a* may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62*a*, drivers 62*b*, and payloads 62*c*. In one embodiment, the applications 62*a* include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88*b*. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

DETAILED DESCRIPTION

Figure 5:
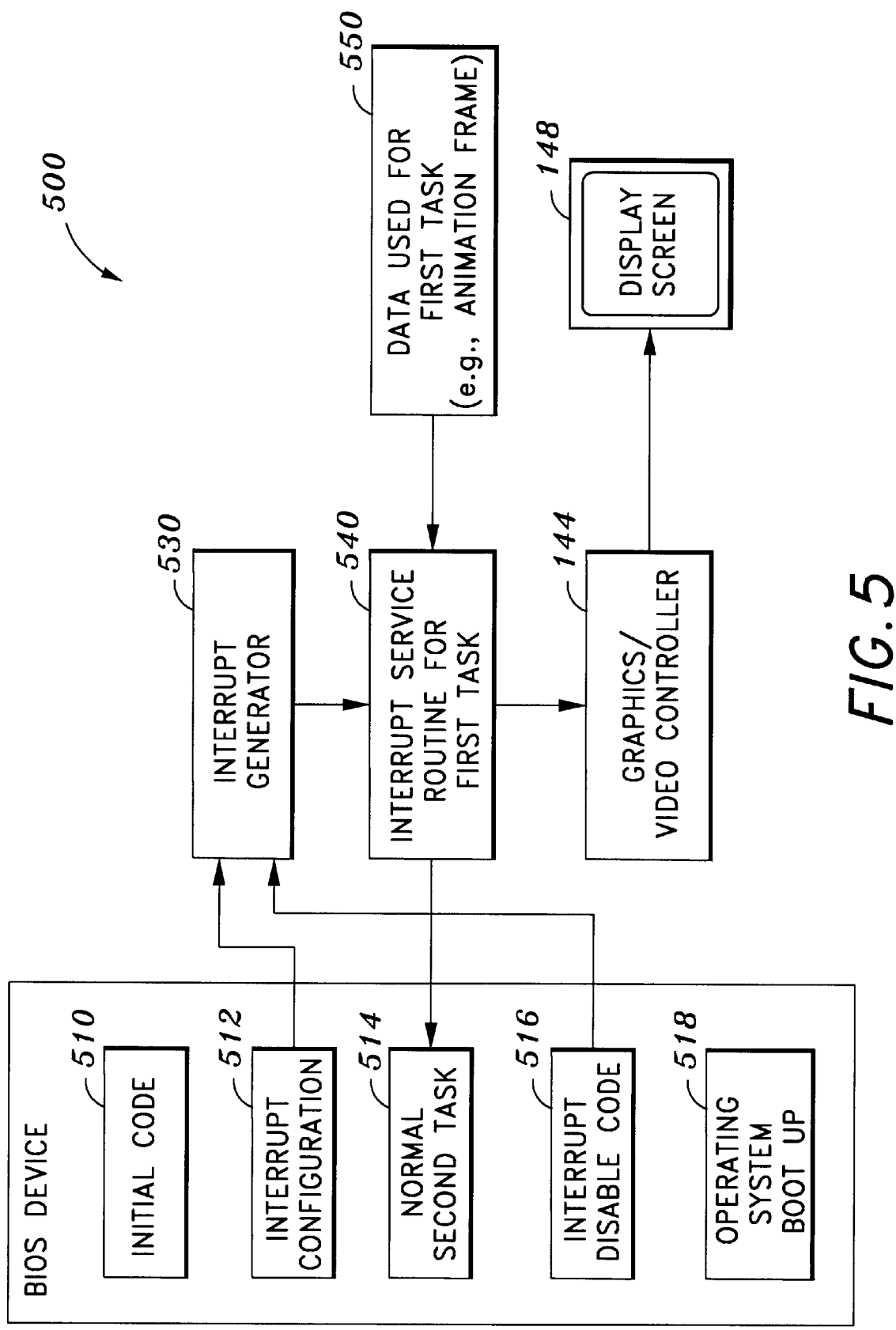
FIG. 5 is a diagram illustrating an architecture to perform multitasking in a basic input and output system (BIOS) according to one embodiment of the invention.

FIG. 5 is a diagram illustrating an architecture 500 to perform multitasking in a basic input and output system (BIOS) according to one embodiment of the invention. The architecture 500 includes the BIOS, an interrupt generator 530, a first task interrupt service routine (ISR) 540, a first task data 550, the graphics/video controller 144, and the display screen 148.

The BIOS includes an initial code 510, and interrupt configuration 512, a normal second task 514, an interrupt disable code 516, and an operating system (OS) boot-up code 518.

The initial code 510 includes code that performs initial BIOS operations to prepare for the multitasking operations. Examples of these initial BIOS operations include hardware reset, initialization of data entry devices (e.g., keyboard, mouse) and output devices (e.g., display, speaker).

The interrupt configuration 520 includes code that configures the interrupt generator 530. In one embodiment, the processor and the chipset are of the Intel Architecture and interrupts can be configured to be System Management Interrupts (SMI). The interrupt configuration 512 schedules the interrupt times such that the task to be performed to respond to the interrupt can be completed without generating any noticeable degradation such as display flickering.

The normal second task 514 includes code to perform the normal BIOS operations. These normal BIOS operations usually take longer to complete than the initial BIOS operations performed by the initial code 510. Examples of these normal BIOS operations include complete memory tests, initialization of peripheral devices such as mass storage controllers, communication interface devices.

The interrupt disable code 516 includes code to disable the interrupt generator 530. The interrupt disable code 516 is optional. The interrupt disable code 516 is invoked when the normal second task 514 is completely performed. The OS boot-up code 518 includes code to load the OS from the mass storage device to the system memory.

The interrupt generator 530 can be configured to generate interrupt signals at predetermined interrupt times. The interrupt generator 530 is configured by the interrupt configuration 512 and is optionally disabled by the interrupt disable code 516. In one embodiment, the interrupt generator 530 is a programmable interval timer that can be programmed to generate an interrupt when the timer reaches a specified value. The programmable interval timer can be programmed to continuously generate the interrupt signals at predetermined intervals or interrupt times. The interval between two consecutive interrupts is selected such that the first task in the interrupt service routine can be performed without having any noticeable degradation effects. For example, if the first task is a graphic animation where an animation frame is continuously refreshed on the display screen, then the interrupt interval is selected such that the animation sequence looks natural and continuous without any flickering or jerky effects.

The first task ISR 540 is the code that responds to the interrupt signal generated by the interrupt generator 530.

The ISR 540 may reside in the same device that contains the BIOS or in a separate device. The ISR 540 is executed each time the interrupt generator 530 generates an interrupt signal such as when the timer reaches a specified value. When the ISR 540 is complete, the program control is returned to the normal second task 514 which will continue to perform the normal second task in the BIOS. The ISR 540 may use data provided by the first task data 550. The ISR 540 may operate upon the graphics engine in performing the first task. For example, the first task may be a graphics animation that display animated sequence of banners and/or advertisements.

The first task data 550 contains data that are used by the first task ISR 540 during performing the first task. Examples of the first task data 550 include animation frames that are pre-generated representing banners and/or advertisements. The first task data 550 typically reside in a storage area separate from the BIOS device. The first task data 550 may be updated as often as necessary by the system.

The graphics/video controller 144 generates display information to be displayed on the display screen 148. The graphics/video controller 144 may be controlled by the ISR 540 in performing the first task such as displaying animated sequence.

FIG. 6 is a flowchart illustrating a process 600 to perform multitasking in a BIOS according to one embodiment of the invention.

Upon START, the process 600 performs a hardware reset to reset all devices and circuitry in the computer system (Block 610). After the hardware reset, the process 600 performs minimal hardware test to prepare for the multitasking operation (Block 615). Then, the process 600 initializes user interaction devices such as keyboard, mouse, display device, graphics engine (Block 620).

The process 600 configures the interrupt generator to generate interrupt signals for the first task (Block 625). In one embodiment, the configuration of the interrupt generator includes setting up a programmable interval timer to generate an interrupt each time the timer reaches a predetermined timing value. Then the process 600 determines if an interrupt has occurred (Block 630). As is known by one skilled in the art, the interrupt mechanism is a hardware process and does not necessarily occur sequentially as shown in a flowchart. If an interrupt has occurred, e.g., an interrupt signal is generated by the interrupt generator, the process 600 performs the first task such as processing animation frames to display on the display screen (Block 635). Then the process 600 goes to Block 640. If an interrupt has not occurred, the process 600 performs the second task or continue to perform the second task (Block 640). Then the process 600 determines if the second task has been completed (Block 645).

If the second task has not been completed, the process 600 returns to block 630 to monitor the interrupt signal. If the second task has been completed, the process 600 optionally disables the interrupt generator (Block 650). If the interrupt generator is not disabled, the first task continues to be performed until the interrupt generator is disabled or reset by the operating system.

Next, the process 600 proceeds to boot up the operating system by transferring the OS from the mass storage device to the system memory. Then the process 600 is terminated.

Although the above flowchart illustrates a multitasking scheme involving two tasks, the technique can be modified to perform more than two tasks. For example, the interrupt generator may be configured to generate different types of interrupt signals. Multiple tasks can then be invoked in separate interrupt service routines according to the corresponding interrupt signals. Alternatively, a single interrupt service routine may also be used to provide service to multiple tasks by examining a task flag configured by the appropriate events.

In one embodiment, the technique is implemented with certain PC chipsets for Pentium category CPUs that support hardware timers that generate System Management Interrupts (SMI) instead of the standard Interrupt Requests to the CPU.

When the BIOS initializes the SMI handler it enables other portions of code to hook themselves into the chain of routines called when an SMI is generated. The System Management Mode (SMM) that is entered when an SMI is received by the CPU gives full access to the system resources without having to modify other portions of code. The SMI handler goes unseen by the interrupted code. This allows an easy implementation of secondary tasks that interrupt the standard BIOS POST.

The animation initialization decompresses the animation data stored in the systems ROM into the systems memory making it accessible to the SMI handler animation code. The decompressed frames for the animation data are stored in the systems memory in a "raw" format not requiring any extra manipulation before being transferred to the video memory. The animation data generally occupies only a portion of the screen. The data contains the position, size, and frame rate at which it should be displayed.

The animation initialization sets up the graphics video mode on standard Video Graphics Adapter (VGA). The mode chosen is generally a mode where one pixel on the screen is one unit in memory (i.e., only one single assembly instruction is required to modify one pixel on the screen). The standard BIOS code is configured so as not to switch video modes until the system is ready to load the operating system. The normal text output of the BIOS is directed to a separate portion of the video memory. This redirection allows the animation to be interrupted if anything goes wrong during the POST. At this time the redirected BIOS text output is displayed to the user just by switching the video mode back to text mode.

The animation initialization routine then hooks the animation code into the chain of SMI handlers and finally enables a hardware timer to generate SMIs. The interval between the interrupts is chosen so that the display framerate is not too slow for the eye and not too fast to the point of using up all the CPUs power. Rates between four to 25 frames per second are acceptable.

The animation SMI handler keeps track of what animation frame needs to be rendered to the screen. Each frame is transferred in turn into the video memory. To avoid flickering while the new frame is transferred the animation handler uses a technique called double-buffering in which a portion of the video adapter's memory that is not displayed can be written to. Once that portion of memory contains the image to be displayed the animation code switches that portion of memory with portion being displayed. It does so by programming certain hardware registers in the video adapter. After a frame is displayed the frame counter is increased so that at the next SMI the next frame will be used.

The complete animation sequence would generally be shorter than the time required for the BIOS to finish its POST. For that reason the animation code would cycle through the frames and restart from the first after the last frame is displayed. This impacts the design of the animation sequence. But the animation might be longer than BIOS POST. In that case the data contains a flag that tells the animation code whether to wait for the end of the sequence or terminate abruptly.

The animation is tentatively terminated when the BIOS has finished initializing the system and is ready to load the OS. At that point the BIOS calls the animation termination code.

The animation termination code is able to wait for the animation sequence to terminate. A flag in the animation data determines this. Once the animation is to be terminated the timer generating the SMIs is disabled, the SMI handling animation code is unchained from the SMI handlers. The BIOS then continues the normal boot process by loading the OS.

Thus, the present invention is an efficient technique to perform multitasking in a BIOS. The BIOS configures an interrupt generator to generate interrupt signals. A first task is performed in response to the interrupt signals at scheduled interrupted times. A normal BIOS second task is performed between the successive interrupt times. The technique provides use of BIOS boot-up time to provide useful and interesting information to the user.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to perform multitasking in a basic input and output system (BIOS) by a processor, the method comprising:

enabling interrupt signals at predetermined interrupt times;

performing a first task in response to the interrupt signals at the interrupt times; and performing a second task between the successive interrupt times.

2. The method of claim 1 further comprising:

disabling the first task after the second task is completely performed.

3. The method of claim 2 wherein the first task is performed repetitively at each interrupt time.

4. The method of claim 3 wherein the first task includes a graphic animation.

5. The method of claim 4 wherein the predetermined interrupt times are sufficiently long to allow the graphic animation to be performed without noticeable flickering.

6. The method of claim 2 wherein the second task includes device testing and initialization.

7. The method of claim 2 wherein the first task is performed by code residing on a device accessible to the processor.

8. The method of claim 2 wherein the second task is part of the BIOS.

9. The method of claim 1 wherein enabling the interrupt signals comprises:

configuring an interrupt controller to generate the interrupt signals at the predetermined interrupt times.

10. The method of claim 1 wherein enabling the interrupt signals comprises:

scheduling an interval timer to generate the interrupt signals at the predetermined interrupt times.

11. A computer program product comprising:
a computer usable medium having computer program code embodied therein to perform multitasking in a basic input and output system (BIOS) by a processor, the computer program product having:
computer readable program code for enabling interrupt signals at predetermined interrupt times;
computer readable program code for performing a first task in response to the interrupt signals at the interrupt times; and
computer readable program code for performing a second task between the successive interrupt times.

12. The computer program product of claim 11 further comprising:
computer readable program code for disabling the first task after the second task is completely performed.

13. The computer program product of claim 12 wherein the first task is performed repetitively at each interrupt time.

14. The computer program product of claim 13 wherein the first task includes a graphic animation.

15. The computer program product of claim 14 wherein the predetermined interrupt times are sufficiently long to allow the graphic animation to be performed without noticeable flickering.

16. The computer program product of claim 12 wherein the second task includes device testing and initialization.

17. The computer program product of claim 12 wherein the first task is performed by code residing on a device accessible to the processor.

18. The computer program product of claim 12 wherein the second task is part of the BIOS.

19. The computer program product of claim 11 wherein the computer readable program code for enabling the interrupt signals comprises:
computer readable program code for configuring an interrupt controller to generate the interrupt signals at the predetermined interrupt times.

20. The computer program product of claim 11 wherein the computer readable program code for enabling the interrupt signals comprises:
computer readable program code for scheduling an interval timer to generate the interrupt signals at the predetermined interrupt times.

21. A computer data signal embodied in a carrier wave comprising:
a multitasking code segment to perform multitasking in a basic input and output system (BIOS) by a processor, the multitasking code segment having:
an interrupt enable code segment for enabling interrupt signals at predetermined interrupt times;
a first task code segment for performing a first task in response to the interrupt signals at the interrupt times; and
a second task code segment for performing a second task between the successive interrupt times.

22. The computer data signal of claim 21 further comprising:
a disable code segment for disabling the first task after the second task is completely performed.

23. The computer data signal of claim 22 wherein the first task is performed repetitively at each interrupt time.

24. The computer data signal of claim 23 wherein the first task includes a graphic animation.

25. The computer data signal of claim 24 wherein the predetermined interrupt times are sufficiently long to allow the graphic animation to be performed without noticeable flickering.

26. The computer data signal of claim 22 wherein the second task includes device testing and initialization.

27. The computer data signal of claim 22 wherein the first task is performed by code residing on a device accessible to the processor.

28. The computer data signal of claim 22 wherein the second task is part of the BIOS.

29. The computer data signal of claim 21 wherein the interrupt enable code segment comprises:
a configuration code segment for configuring an interrupt controller to generate the interrupt signals at the predetermined interrupt times.

30. The computer data signal of claim 21 wherein the interrupt enable code segment comprises:
a scheduler code segment for scheduling an interval timer to generate the interrupt signals at the predetermined interrupt times.

31. A system comprising;
a processor; and
a memory coupled to the processor, the memory containing a program code, the program code when executed by the processor causing the processor to:
enable interrupt signals at predetermined interrupt times,
perform a first task in response to the interrupt signals at the interrupt times, and
perform a second task between the successive interrupt times.

32. The system of claim 31 wherein the program code, when executed by the processor further causing the processor to:
disable the first task after the second task is completely performed.

33. The system of claim 32 wherein the first task is performed repetitively at each interrupt time.

34. The system of claim 33 wherein the first task includes a graphic animation.

35. The system of claim 34 wherein the predetermined interrupt times are sufficiently long to allow the graphic animation to be performed without noticeable flickering.

36. The system of claim 32 wherein the second task includes device testing and initialization.

37. The system of claim 32 wherein the first task is performed by code residing on a device accessible to the processor.

38. The system of claim 32 wherein the second task is part of the BIOS.

39. The system of claim 31 wherein the program code causing the processor to enable the interrupt signals by causing the processor to:
configure an interrupt controller to generate the interrupt signals at the predetermined interrupt times.

40. The system of claim 31 wherein the program code causing the processor to enable the interrupt signals by causing the processor to:
schedule an interval timer to generate the interrupt signals at the predetermined interrupt times.

* * * * *